United States Patent
Fellague et al.

(10) Patent No.: US 8,079,407 B2
(45) Date of Patent: Dec. 20, 2011

(54) INTEGRATED HEAT EXCHANGERS FOR ECS AND OBIGGS APPLICATIONS

(75) Inventors: Kader A. Fellague, Redondo Beach, CA (US); Joseph Borghese, Yucca Valley, CA (US)

(73) Assignee: Honeywell International Inc., Morristown, NJ (US)

( * ) Notice: Subject to any disclaimer, the term of this patent is extended or adjusted under 35 U.S.C. 154(b) by 1243 days.

(21) Appl. No.: 11/558,112

(22) Filed: Nov. 9, 2006

(65) Prior Publication Data

US 2008/0110603 A1    May 15, 2008

(51) Int. Cl.
*F28D 7/10*    (2006.01)
*F28F 3/00*    (2006.01)

(52) U.S. Cl. ........................ 165/140; 165/166

(58) Field of Classification Search .................. 165/165, 165/166, 167, 168, 170, 140; 62/401, 402, 62/172
See application file for complete search history.

(56) References Cited

U.S. PATENT DOCUMENTS

| | | | |
|---|---|---|---|
| 3,537,513 A * | 11/1970 | Bridgnell et al. ............... | 165/70 |
| 5,887,445 A | 3/1999 | Murry et al. | |
| 6,205,803 B1 * | 3/2001 | Scaringe ...................... | 62/259.2 |
| 6,343,645 B1 * | 2/2002 | Baumann et al. ............. | 165/140 |
| 6,629,428 B1 | 10/2003 | Murry | |
| 6,824,906 B2 * | 11/2004 | Wattelet et al. ................ | 429/26 |
| 6,837,304 B2 * | 1/2005 | Makino et al. ................ | 165/135 |
| 7,017,365 B2 * | 3/2006 | Haas et al. ...................... | 62/402 |
| 7,048,231 B2 | 5/2006 | Jones | |
| 7,188,492 B2 * | 3/2007 | Corduan et al. ................ | 62/640 |
| 7,243,710 B2 * | 7/2007 | Shinhama ...................... | 165/140 |
| 2002/0121103 A1* | 9/2002 | Udobot et al. .................. | 62/402 |
| 2004/0206482 A1* | 10/2004 | Bang ............................ | 165/140 |
| 2005/0235659 A1 | 10/2005 | Brutscher et al. | |
| 2006/0123831 A1 | 6/2006 | Jones | |
| 2006/0151669 A1 | 7/2006 | Jones | |

* cited by examiner

*Primary Examiner* — Tho V Duong
(74) *Attorney, Agent, or Firm* — Robert Desmond, Esq.

(57) ABSTRACT

An integrated heat exchanger comprises a primary heat transfer zone and a secondary heat transfer zone integral to the primary heat transfer zone. The primary heat transfer zone comprises an ECS heat exchanger and the secondary heat transfer zone comprises a heat exchanger for a secondary system, such as an OBIGGS heat exchanger. The integrated heat exchanger reduces the negative impact that the OBIGGS heat exchanger has on the ECS heat exchanger by providing one ram face, thereby minimizing the flow disturbances associated with the OBIGGS heat exchanger. By integrating the OBIGGS and the ECS heat exchanger, the integrated heat exchanger reduces the negative impact of the pressure drop and heat load caused by the OBIGGS heat exchanger.

8 Claims, 11 Drawing Sheets

INTEGRATED HEAT EXCHANGERS FOR ECS AND OBIGGS APPLICATIONS

BACKGROUND OF THE INVENTION

The present invention generally relates to heat exchangers and, more particularly, to integrated heat exchangers.

Fuel tank inerting systems (FTIS) typically use bleed air from engines that is fed into air separation modules (ASM) for the purpose of inerting fuel tanks. It is necessary to cool the bleed air to an acceptable temperature, for example about 200 deg F. The bleed air can be cooled with a heat exchanger that uses outside atmospheric air as a heat sink.

Figure 1:
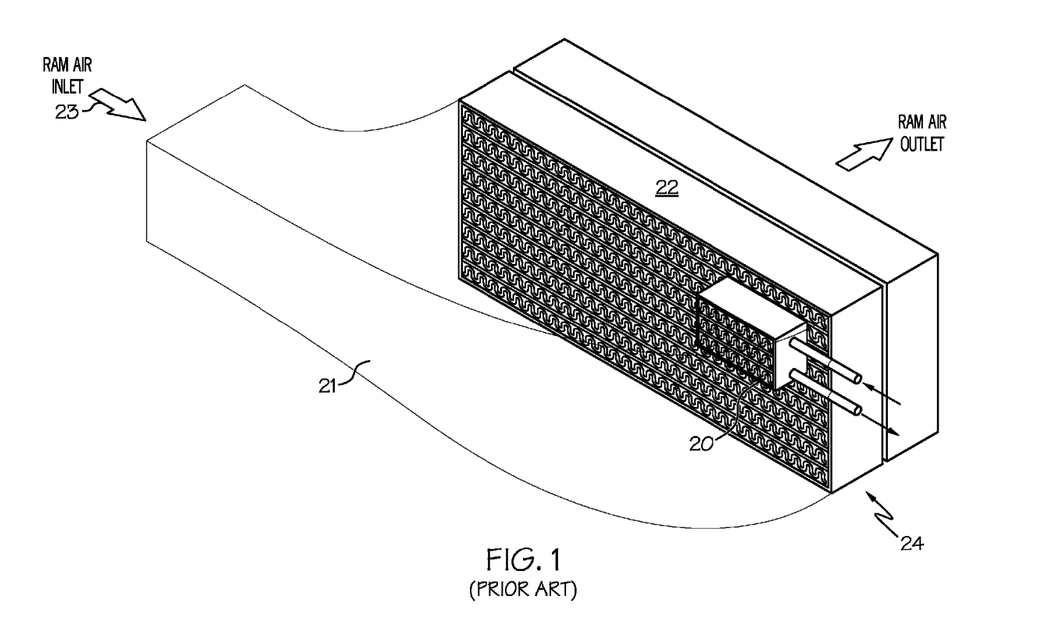
FIG. 1 is perspective view of a prior art FTIS heat exchanger.

A prior art FTIS heat exchanger 20 is depicted in FIG. 1. The prior art FTIS heat exchanger 20 is positioned within a ram air plenum 21. The cooling can be induced by a fan (not shown) that is part of an environmental control system (ECS) air cycle machine. The prior art FTIS heat exchanger 20 comprises a separate entity and can be placed upstream of a prior art ECS heat exchanger 22 in series relative to a flow of ram air 23. For configurations that have an in-series placement, the flow of ram air 23 can pass through the upstream prior art FTIS heat exchanger 20 before entering the downstream prior art ECS heat exchanger 22. In such a configuration as used on aircraft applications, the inerting heat load from the prior art FTIS heat exchanger 20 can end up being dumped on the prior art ECS heat exchanger 22. The dumping of the inerting heat load onto the prior art ECS heat exchanger 22 has a negative impact on the performance of the ECS.

Figure 2A:
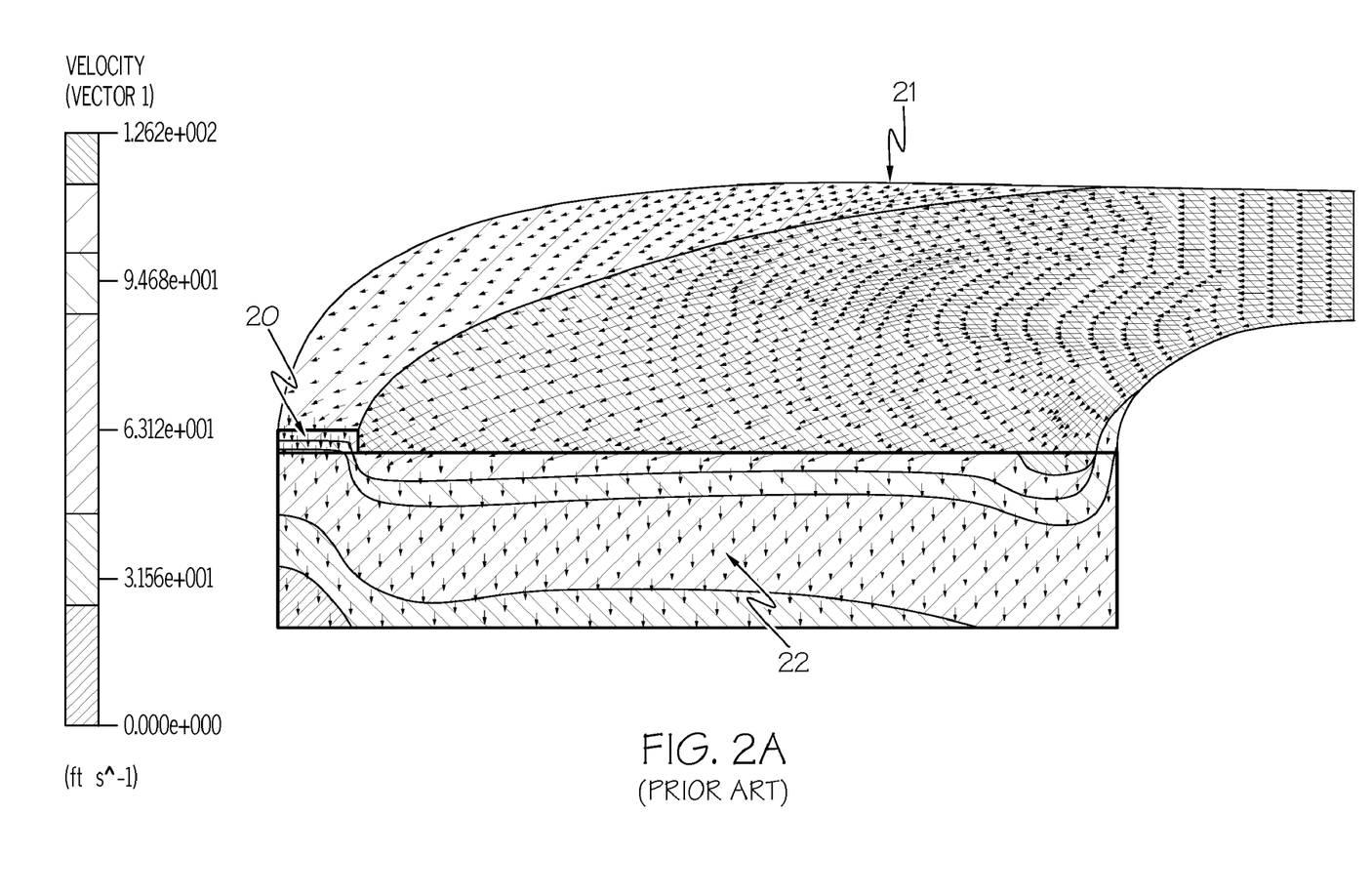
FIG. 2a is a diagram of a CFD analysis showing velocity vectors of the prior art configuration of FIG. 1.
Figure 2B:
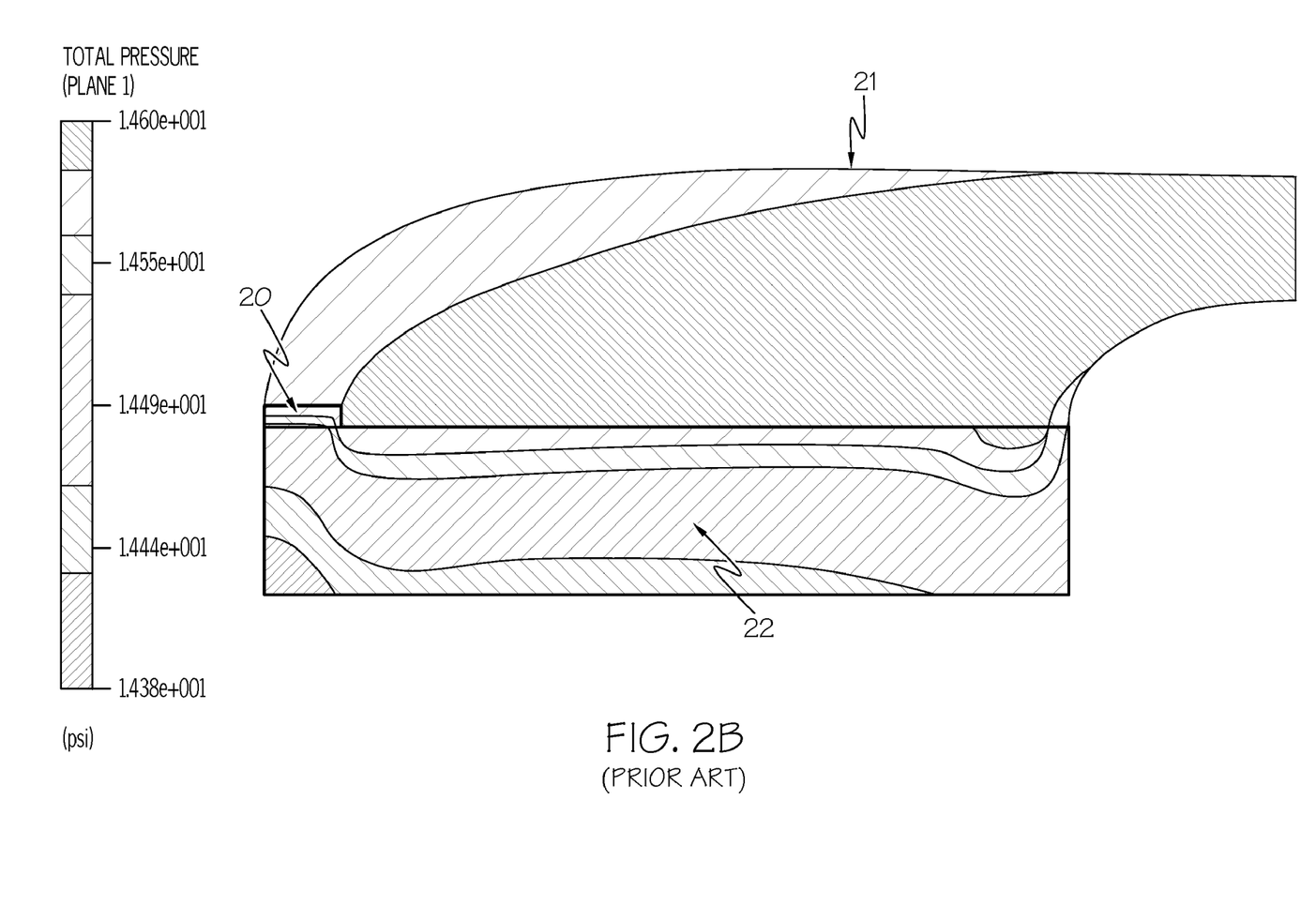
FIG. 2b is a diagram of a CFD analysis showing pressure of the prior art configuration of FIG. 1.

The prior art FTIS heat exchanger 20 also can negatively impact the fluid dynamics within the ram air plenum 21. A diagram of a computational fluid dynamic (CFD) analysis showing velocity vectors of the prior art configuration is shown in FIG. 2a. A diagram of a CFD analysis showing pressure of the prior art configuration is shown in FIG. 2b. FIGS. 2a and 2b depict CFD analyses along a center slice 24 (see FIG. 1) of FIG. 1. As can be seen, the prior art ECS heat exchanger 22 experiences an additional pressure drop in the area immediately downstream of the prior art FTIS heat exchanger 20. The additional pressure drop induced by the prior art FTIS heat exchanger 20 adds to the power consumed by the fan which comes at the expense of ECS performance on the ground. The net effect is an increase in the cabin stabilized temperature above the specified value for the cabin.

U.S. Patent Application No. 2005/0235659, describes an air conditioning system heat exchanger connected to a second heat exchanger by a closable line and valve. The second heat exchanger can be an on-board inert gas generating system (OBIGGS) or an on-board oxygen generating system (OBOGS) heat exchanger. The closable line allows the ram air that passes through the second heat exchanger to be used for the air conditioning system when the second system (OBIGGS or OBOGS) is not in use. Although the described system may provide additional cooling for the air conditioning system when the OBIGGS is not in use, the closable line and valve adds complexity to the system. Further, the disturbances in the ram flow (turbulence) caused by the OBIGGS heat exchanger can reduce the efficiency of the air conditioning heat exchanger.

As can be seen, there is a need for systems that can reduce the negative impact that the OBIGGS heat exchangers have on the ECS heat exchangers. Further, systems are needed wherein the flow disturbances associated with the OBIGGS heat exchangers are reduced. Moreover, systems are needed that reduce the negative impact of the pressure drop caused by the OBIGGS heat exchanger.

SUMMARY OF THE INVENTION

In one aspect of the present invention, an apparatus comprises a primary heat transfer zone, the primary heat transfer zone comprising a heat exchanger of an air conditioning system; and a secondary heat transfer zone integral to the primary heat transfer zone, the secondary heat transfer zone comprising a heat exchanger for a secondary system.

In another aspect of the present invention, an apparatus comprises a stacked arrangement of alternating heat transfer layers and cooling flow layers, one portion of the stacked arrangement comprising a primary heat transfer zone and another portion of the stacked arrangement comprising a secondary heat transfer zone, the primary heat transfer zone comprising a heat exchanger that receives a first flow in need of cooling from an air conditioning system, the secondary heat transfer zone comprising a heat exchanger that receives a second flow in need of cooling from a secondary system.

In a further aspect of the present invention, a method of cooling a first flow in need of cooling and a second flow in need of cooling comprises the steps of passing the first flow in need of cooling through a primary heat transfer zone of an integrated heat exchanger; passing the second flow in need of cooling through a secondary heat transfer zone of the integrated heat exchanger; and passing a cooling flow through at least one cooling flow layer of the integrated heat exchanger.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides integrated heat exchangers for use with two or more systems, such as but not limited to an ECS and an OBIGGS, and methods for producing the same. Embodiments of the present invention may find beneficial use in many industries including aerospace, automotive, and electricity generation. Embodiments of the present invention may be useful in applications including ECS, OBIGGS, OBOGS, vapor cycle condensers and cabin air compressor motor cooler systems. Embodiments of the present invention may be useful in any heat exchanger application including, but not limited to, integrated heat exchangers for aircraft ECS and OBIGGS.

In one embodiment, the present invention provides an integrated heat exchanger having a primary heat transfer zone and a secondary heat transfer zone. The primary heat transfer zone can be adapted to comprise an ECS heat exchanger and the secondary heat transfer zone can be adapted to comprise an OBIGGS heat exchanger. This is unlike the prior art wherein the ECS heat exchanger and the OBIGGS heat exchangers each are separate structures. The integrated heat exchanger of the present invention may allow the ECS heat exchanger and the OBIGGS heat exchanger to be optimized together to minimize the impact on each other. This is unlike the prior art wherein the ECS heat exchanger and the OBIGGS heat exchanger are separate structures that are optimized separate from one another. When optimizing the ECS and OBIGGS heat exchangers separately, the impact of one on the other may not be minimized. Unlike the prior art, embodiments of the present invention can comprise a FTIS heat exchanger combined with an ECS heat exchanger in a parallel configuration. A "parallel" configuration may be a configuration wherein the FTIS heat exchanger is positioned parallel to the ECS heat exchanger relative to the ram flow and positioned such that the upstream end of the FTIS heat exchanger is adjacent to the upstream end of the ECS heat exchanger. The parallel configuration may be better for some applications because the inerting heat load from the FTIS heat exchanger may not be dumped onto the ECS heat exchanger. Further, unlike the prior art comprising two separate heat exchangers, and therefore two separate ram faces (plane of the heat exchanger that faces the ram flow), embodiments of the present invention can comprise one integrated heat exchanger and one ram face. This may reduce the air flow disturbances and temperature disturbances that can negatively impact the cabin temperature.

Figure 3:
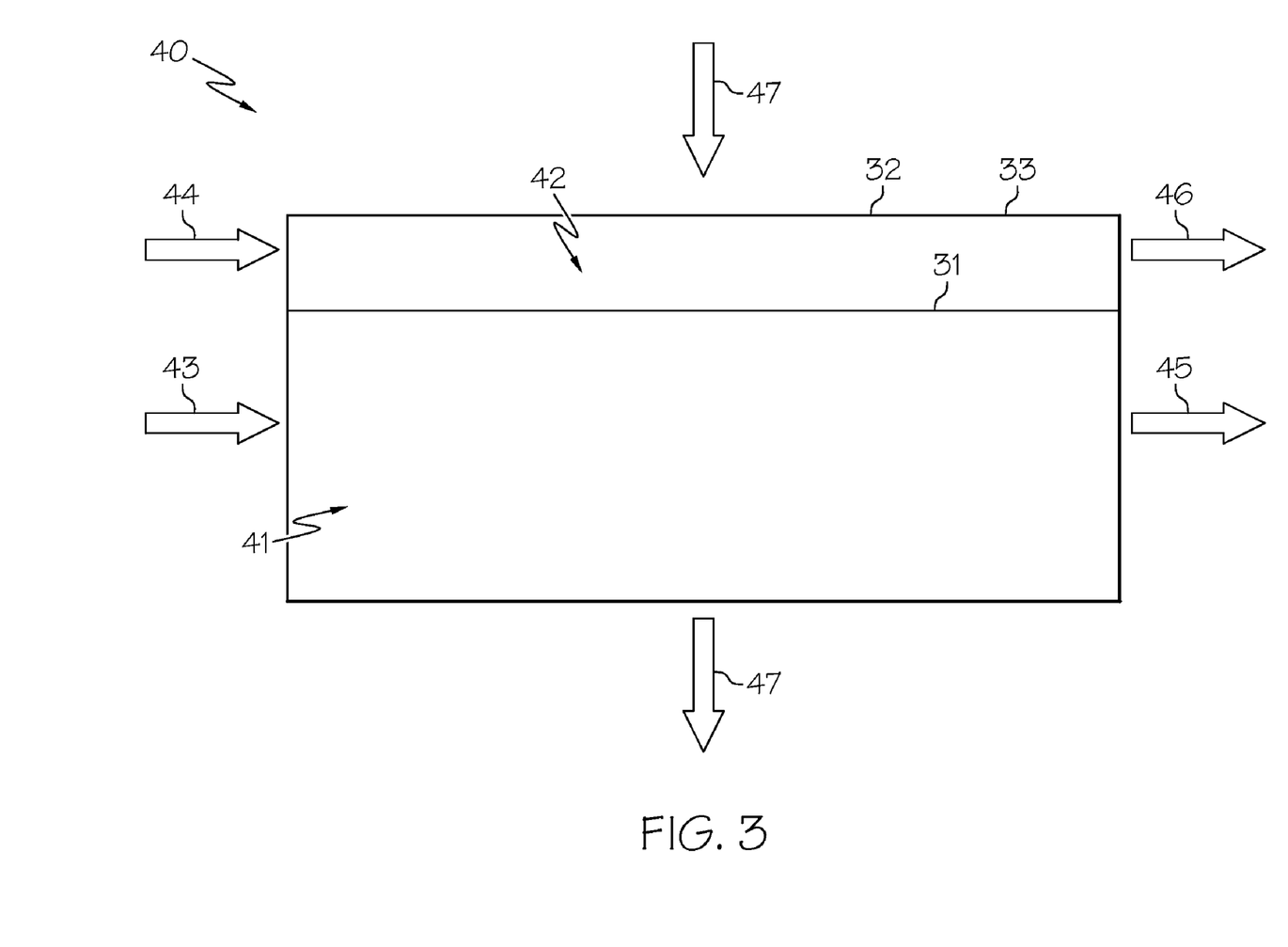
FIG. 3 is a diagram of an integrated heat exchanger according to an embodiment of the present invention.

An integrated heat exchanger 40 according to one embodiment of the present invention is depicted in FIG. 3. The integrated heat exchanger 40 can comprise a structure having a primary heat transfer zone 41 and a secondary heat transfer zone 42. The primary heat transfer zone 41 can be mechanically connected to the secondary heat transfer zone 42. The secondary heat transfer zone 42 may be integral to the first heat transfer zone 41. The primary heat transfer zone 41 may be designed to receive a first flow in need of cooling 43, such as a flow of bleed air for use in an air conditioning system 60 (see FIG. 8), and designed to provide a first cooled flow 45. The secondary heat transfer zone 42 may be designed to receive a second flow in need of cooling 44, such as a flow of bleed air for use in an OBIGGS 70 (see FIG. 9), and designed to provide a second cooled flow 46. The integrated heat exchanger 40 may be designed to receive a cooling flow 47 (e.g. ram air) such that the cooling flow 47 may be in thermal contact with the primary heat transfer zone 41 and in thermal contact with the secondary heat transfer zone 42. For some applications, the cooling flow 47 may comprise other fluids, such as water, in lieu of ram air.

Figure 8:
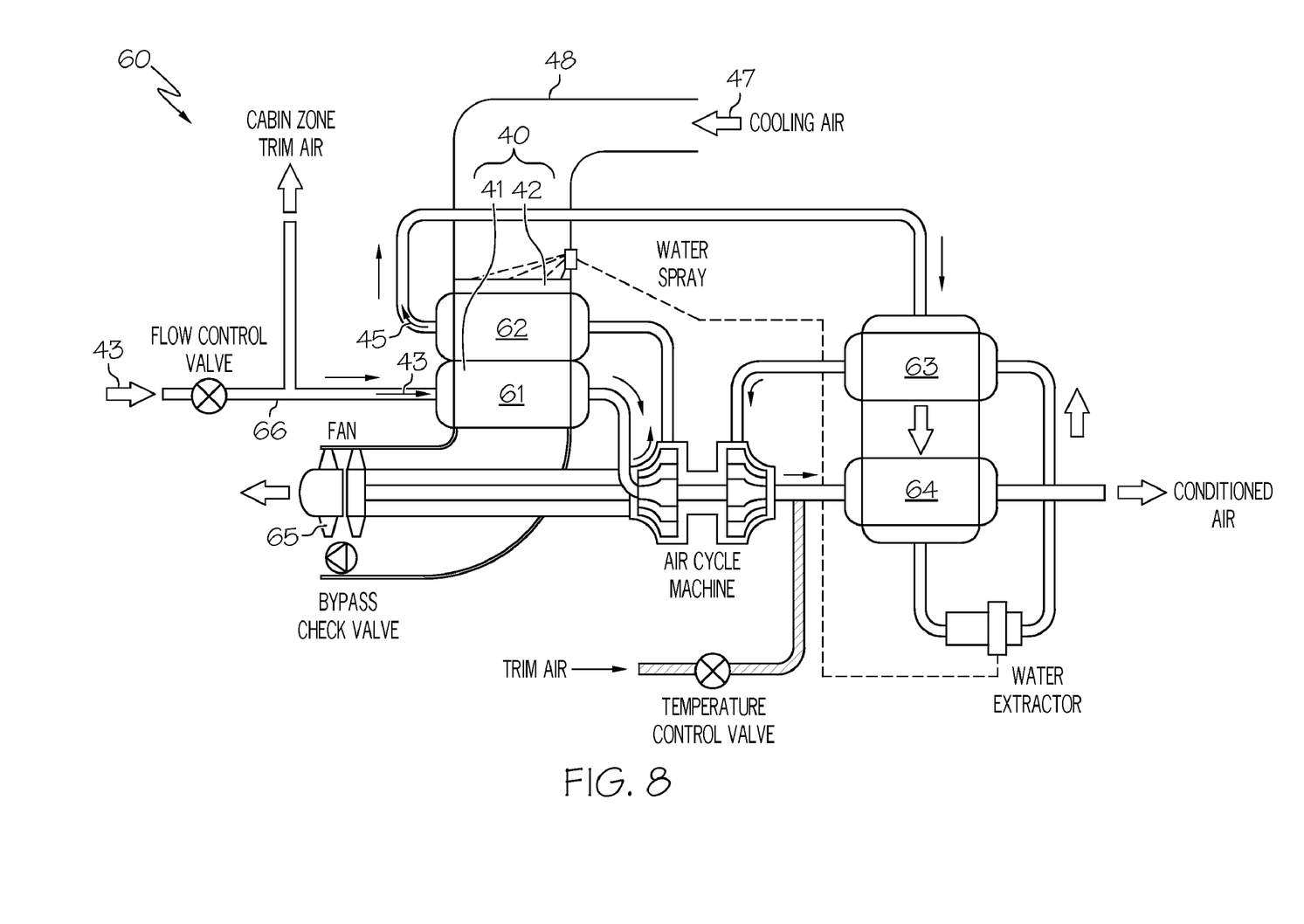
FIG. 8 is a diagram of an air conditioning system according to an embodiment of the present invention.
Figure 9:
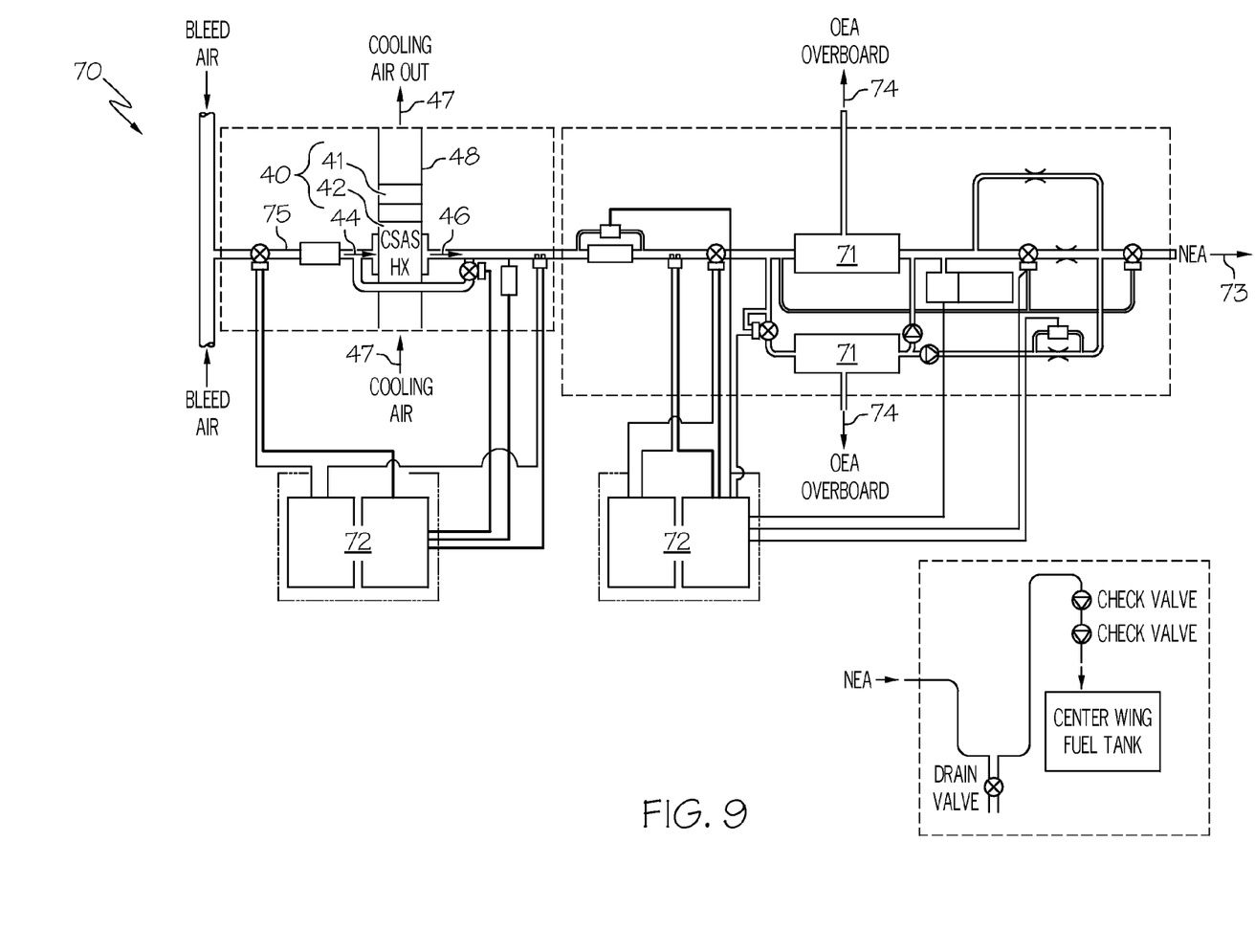
FIG. 9 is a diagram of an on-board inert gas generating system according to an embodiment of the present invention.

The primary heat transfer zone 41 may comprise a heat exchanger for the air conditioning system 60. The primary heat transfer zone 41 may receive the first flow in need of cooling 43 from a component of the air conditioning system 60, such as an air conditioning line 66, as depicted in FIG. 8. The secondary heat transfer zone 42 may comprise a heat exchanger for a secondary system, such as the OBIGGS 70. The secondary heat transfer zone 42 may receive the second flow in need of cooling 44 from a component of the secondary system, such as an OBIGGS line 75, as depicted in FIG. 9. The secondary system can include any system that provides the secondary flow in need of cooling 44, such as but not limited to, on-board oxygen generating systems (OBOGS), cabin air compressor motor coolers, and vapor cycle condensers.

Figure 4:
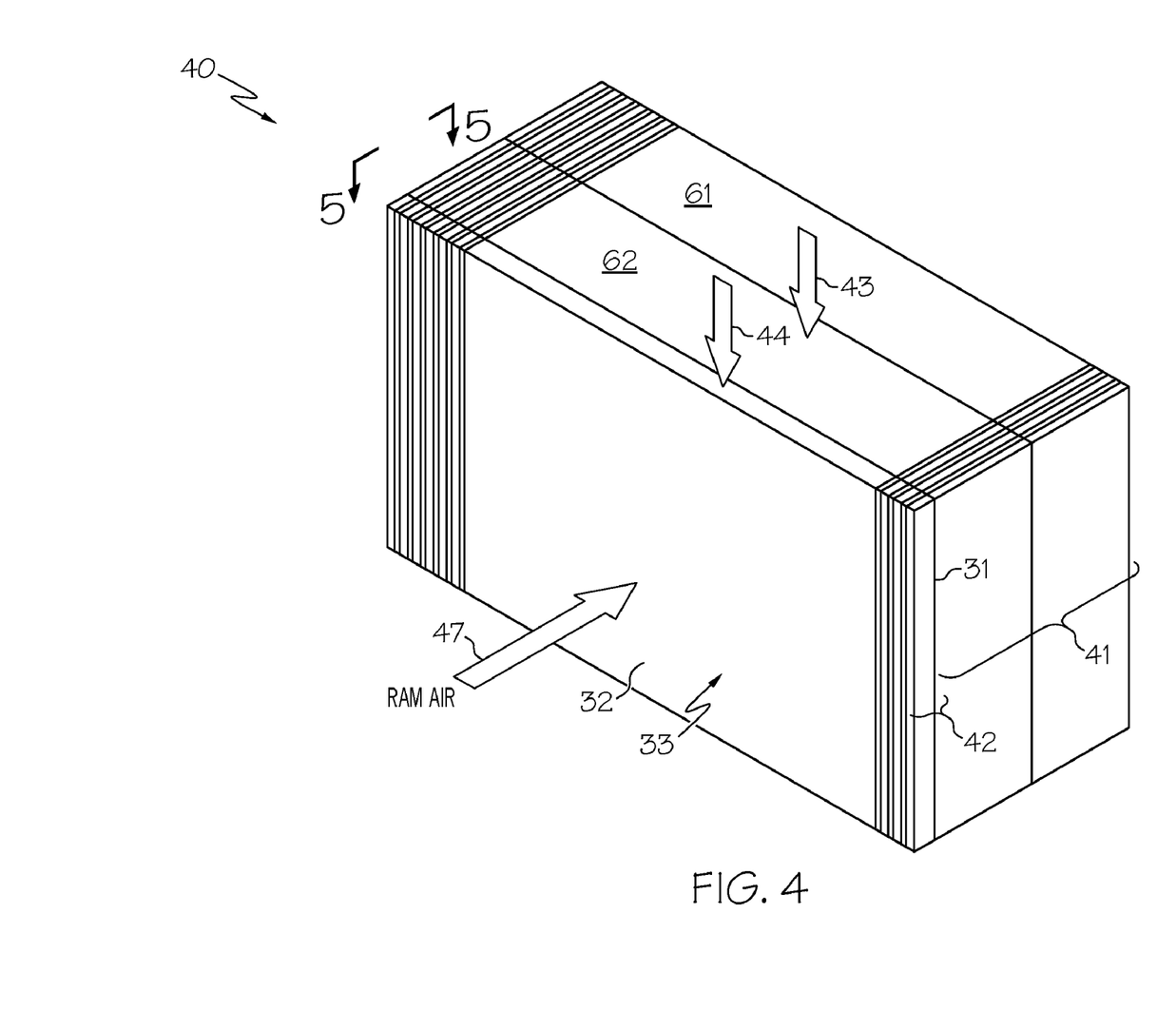
FIG. 4 is a perspective view of an integrated heat exchanger according to an embodiment of the present invention.

For some embodiments, the primary heat transfer zone 41 and the secondary heat transfer zone 42 may be positioned in series relative to the cooling flow 47, as depicted in FIG. 4 (in-series heat transfer zone configuration). As defined herein, an "in-series heat transfer zone configuration" may be a configuration wherein the secondary heat transfer zone 42 is integral to and positioned upstream of the primary heat transfer zone 41 relative to the cooling flow 47. For the "in-series heat transfer zone configuration" a primary zone upstream face 31 may be downstream from a secondary zone upstream face 32. The primary zone upstream face 31 may be the plane of the primary heat transfer zone 41 that faces the cooling flow 47. The secondary zone upstream face 32 may be the plane of the secondary heat transfer zone 42 that faces the cooling flow 47. In other words, for the integrated heat exchanger 40 having the "in-series heat transfer zone configuration", an exchanger upstream face 33 (ram face) of the integrated heat exchanger 40 may comprise the secondary zone upstream face 32. The exchanger upstream face 33 may be the plane of the integrated heat exchanger 40 that faces the cooling flow 47. The exchanger upstream face 33 may be defined by a plane (positioned within one plane). Structures within the path of the cooling flow 47 may affect the turbulence within the cooling flow 47. Because the exchanger upstream face 33 may comprise a plane, turbulence within the cooling flow 47 may be minimized.

Figure 6:
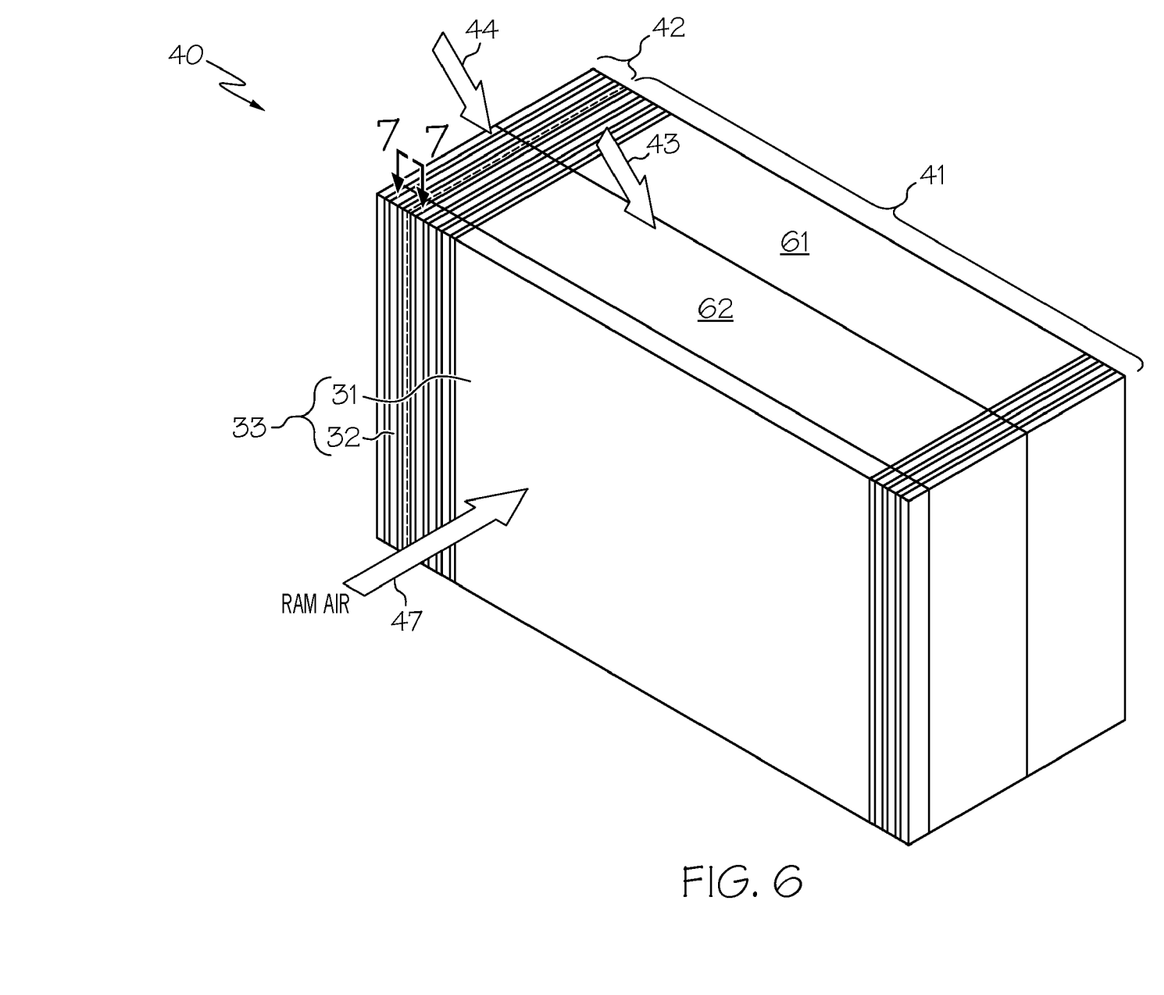
FIG. 6 is perspective view of an integrated heat exchanger according to another embodiment of the present invention.

Alternatively, the primary heat transfer zone 41 and the secondary heat transfer zone 42 may be positioned parallel to each other relative to the cooling flow 47, as depicted in FIG. 6 (parallel heat transfer zone configuration). As defined herein, a "parallel heat transfer zone configuration" may be a configuration wherein the secondary heat transfer zone 42 is integral to and positioned parallel to the primary heat transfer zone 41 relative to the cooling flow 47. For the "parallel heat transfer zone configuration" the primary zone upstream face 31 may be adjacent to and in the same plane as the secondary zone upstream face 32. In other words, for the integrated heat exchanger 40 having the "parallel heat transfer zone configuration", the exchanger upstream face 33 of the integrated heat exchanger 40 may comprise the primary zone upstream face 31 and the secondary zone upstream face 32.

Figure 5A:
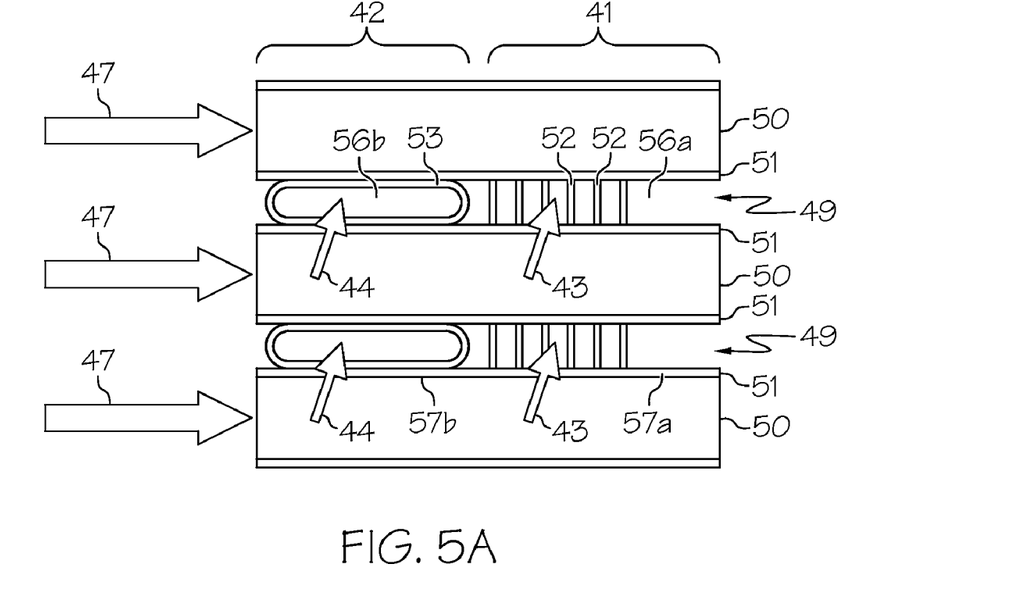
FIG. 5a is a view through line 5-5 of FIG. 4 according to one embodiment of the present invention.
Figure 5B:
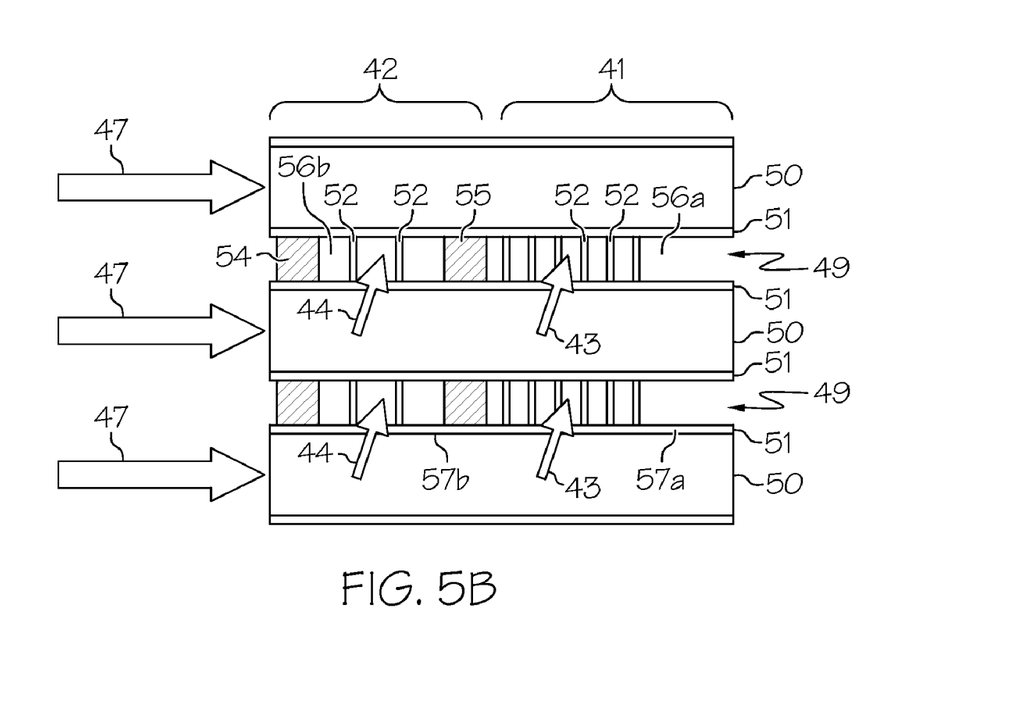
FIG. 5b is a view through line 5-5 of FIG. 4 according to another embodiment of the present invention.

The primary heat transfer zone 41 and the secondary heat transfer zone 42 each may comprise at least one heat transfer layer 49, at least one cooling flow layer 50 and a separator plate 51 positioned between and in contact with the heat transfer layer 49 and the cooling flow layer 50, as depicted in FIGS. 5a and 5b. The primary heat transfer zone 41 and the secondary heat transfer zone 42 each may comprise a plurality of heat transfer layers 49 and a plurality of cooling flow layers 50. The heat transfer layers 49 of the primary heat transfer zone 41 may be adapted to receive the first flow in need of cooling 43. The heat transfer layers 49 of the secondary heat transfer zone 42 may be adapted to receive the second flow in need of cooling 44. The cooling flow layers 50 of both the primary heat transfer zone 41 and the secondary heat transfer zone 42 may be designed to receive at least a portion of the cooling flow 47.

For embodiments having the in-series heat transfer zone configuration, the primary heat transfer zone 41 may comprise a first layer portion 56a (one portion of the heat transfer layer 49) and the secondary heat transfer zone 42 may comprise a second layer portion 56b (another portion of the heat transfer layer 49), as depicted in FIGS. 5a and 5b. In other words, embodiments having the in series heat transfer zone configuration may be designed such that the primary heat transfer zone 41 and the secondary heat transfer zone 42 share the heat transfer layers 49.

Figure 7:
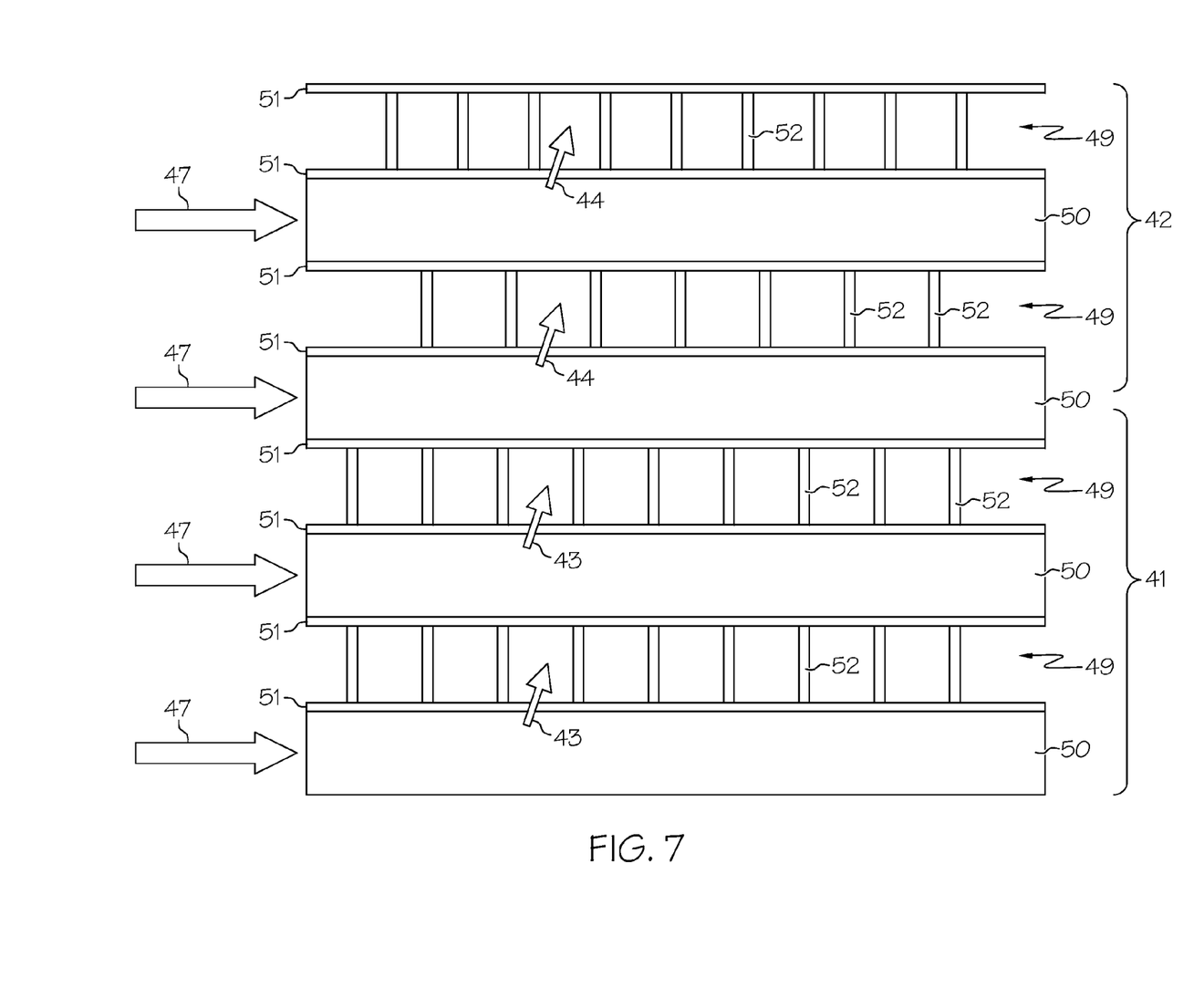
FIG. 7 is a view through line 7-7 of FIG. 6.

Alternatively, for embodiments having the parallel heat transfer zone configuration, the primary heat transfer zone 41 may comprise one heat transfer layer 49 and the secondary heat transfer zone 42 may comprise another heat transfer layer 49, as depicted in FIG. 7. In other words, the primary heat transfer zone 41 and the secondary heat transfer zone 42 each may comprise different heat transfer layers 49.

The heat transfer layers 49 and the cooling flow layers 50 may be positioned in a stacked arrangement of alternating heat transfer layers 49 and cooling flow layers 50. One heat transfer layer 49 may be positioned between two cooling flow layers 50; and one cooling flow layer 50 may be positioned between two heat transfer layers 49. The number of heat transfer layers 49 and cooling flow layers 50 may vary with application and may depend on the cooling requirements of the particular application. Embodiments of the integrated heat exchanger 40 may comprise a stacked arrangement of alternating heat transfer layers 49 and cooling flow layers 50; one portion of the stacked arrangement may comprise the primary heat transfer zone 41 and another portion of the stacked arrangement may comprise the secondary heat transfer zone 42.

The primary heat transfer zone 41 and the secondary heat transfer zone 42 each may comprise a plurality of separator plates 51 positioned such that one separator plate 51 is between and in contact with each heat transfer layer/cooling flow layer pair. In other words, the separator plate 51 may be positioned between the heat transfer layer 49 and the cooling flow layer 50. As defined herein, a heat transfer layer/cooling flow layer pair may comprise a heat transfer layer 49 and a cooling flow layer 50 positioned adjacent to one another.

For embodiments having the in series heat transfer zone configuration, the primary heat transfer zone 41 may comprise a first plate portion 57a (one portion of the separator plate 51) and the secondary heat transfer zone 42 may comprise a second plate portion 57b (another portion of the separator plate 51), as depicted in FIGS. 5a and 5b. In other words, the in-series configurations may be designed such that the primary heat transfer zone 41 and the secondary heat transfer zone 42 share the separator plates 51. Alternatively, for embodiments having the parallel heat transfer zone configuration, the primary heat transfer zone 41 and the secondary heat transfer zone 42 each may comprise different separator plates 51, as depicted in FIG. 7.

A plurality of fins 52 may be included in the heat transfer layer 49, as depicted in FIGS. 5a, 5b and 7. The cooling flow layer 50 also may include a plurality of fins 52 (fins 52 positioned in the cooling flow layer 50 are not depicted). Each fin 52 may be in contact with and extend between two adjacent separator plates 51. The fins 52 may direct the flow (first flow in need of cooling 43, second flow in need of cooling 44, cooling flow 47) through the integrated heat exchanger 40.

The fins 52 may increase the surface area available for heat transfer and thereby may enhance the efficiency of the integrated heat exchanger 40. For some embodiments, a plurality of flat tubes 53 may be used in lieu of the fins 52 in the second heat transfer zone 42, as depicted in FIG. 5a. Embodiments of the present invention may comprise any combination the fins 52 and/or the flat tubes 53. For some embodiments, the fins 52 and/or the flat tubes 53 may be brazed directly to the separator plates 51. For some embodiments, such as integrated heat exchangers for ECS and OBIGGS applications, the fins 52 each may have a height of between about 0.1 inches and about 0.5 inches. The height of the fins 52 may be about equal to the distance between two adjacent separator plates 51. For some embodiments, for example some aircraft applications, other structures, such as corrugated sheets (not shown), may be used in lieu of the fins 52 and/or the flat tubes 53. The usefulness of other structures, such as the corrugated sheets, in lieu of the fins 52 and/or flat tubes 53 may depend on the heat transfer requirements of a particular application and may reduce manufacturing time.

The heat transfer layer 49 may include at least one header bar 54, as depicted in FIG. 5b. The header bar 54 may be positioned parallel to the flow through the heat transfer layer 49. One header bar 54 may be positioned at one side of the heat transfer layer 49 and another header bar 54 may be positioned at the opposing side of the heat transfer layer 49. For embodiments having the in series heat transfer zone configuration, a separator bar 55 may be positioned between the primary heat transfer zone 41 and the secondary heat transfer zone 42, as depicted in FIG. 5b. The header bars 54 and the separator bars 55 may be brazed to the separator plates 51 and may provide structural support to the integrated heat exchanger 40.

Embodiments having the in series heat transfer zone configuration may be more efficient than embodiments having the parallel heat transfer zone configuration because all of the cooling flow 47 may pass through both the primary heat transfer zone 41 and the secondary heat transfer zone 42 for the in series configurations as opposed to the parallel configurations wherein one portion of the cooling flow 47 may pass through the primary heat transfer zone 41 and another portion of the cooling flow 47 may pass through the secondary heat transfer zone 42. However, embodiments having the in series heat transfer zone configuration may be more costly to manufacture than embodiments having the parallel heat transfer zone configuration. The desired configuration (parallel verses in series) for a particular application may be determined by factors including manufacturing cost and heat exchanger efficiency.

For some applications—such as the air conditioning system 60 shown in FIG. 8 and the OBIGGS 70 shown in FIG. 9, for example—the integrated heat exchanger 40 may be positioned in a ram shaft 48. The primary heat transfer zone 41 may be operationally connected to the air conditioning system 60, as depicted in FIG. 8. The primary heat transfer zone 41 may comprise a heat exchanger of the air conditioning system 60. The secondary heat transfer zone 42 may be operationally connected to a secondary system, such as the OBIGGS 70, as depicted in FIG. 9. The secondary heat transfer zone 42 may comprise a heat exchanger of the OBIGGS 70. For simplification, the components of the OBIGGS 70 are not depicted in FIG. 8, and the components of the air conditioning system 60 are not depicted in FIG. 9. The ram shaft 48 and/or a fan 65 (see FIG. 8) positioned in the ram shaft 48 may provide the cooling flow 47. For some applications, the fan 65 may be turbo-compressor driven or electrically driven. The fan 65 may increase the momentum of the cooling flow 47.

During operation, a cabin air compressor (not shown) may provide the first flow in need of cooling 43 to the primary heat transfer zone 41, as depicted in FIG. 8. At least a portion of the cooling flow 47 may pass through the primary heat transfer zone 41 thereby cooling the first flow in need of cooling 43 such that the first cooled flow 45 is provided. For embodiments wherein the primary heat transfer zone 41 and the secondary heat transfer zone 42 are positioned in series relative to the cooling flow 47 (in-series heat transfer zone configuration), all of the cooling flow 47 may pass through the primary heat transfer zone 41. For embodiments wherein the primary heat transfer zone 41 and the secondary heat transfer zone 42 are positioned parallel relative to the cooling flow 47 (parallel heat transfer zone configuration), one portion of the cooling flow 47 may pass through the primary heat transfer zone 41 and another portion of the cooling flow 47 may pass through the secondary heat transfer zone 42.

For some embodiments wherein the air conditioning system 60 comprises an air cycle pack configuration, as depicted in FIG. 8, the primary heat transfer zone 41 may include a primary heat exchanger 61 and a secondary heat exchanger 62. For embodiments where the air conditioning system 60 has a vapor cycle pack configuration, the primary heat transfer zone 41 may comprise the primary heat exchanger 61. Air conditioning systems 60 that may be useful with some embodiments of the present invention may include the air cycle pack configurations described in U.S. Pat. No. 5,887,445 and the vapor cycle pack configurations described in U.S. Pat. No. 6,629,428, both of which are incorporated herein by reference. Any air conditioning system 60 may be useful with the present invention.

For some applications, the first flow in need of cooling 43 may enter the primary heat transfer zone 41 where it may be cooled by the primary heat exchanger 61 and the secondary heat exchanger 62 to provide the first cooled flow 45. The first cooled flow 45 then may be directed to components of the air conditioning system 60, such as a reheater 63 and a condenser 64, as depicted in FIG. 8.

The secondary heat transfer zone 42 may be operationally connected to the OBIGGS 70, as depicted in FIG. 9. Alternatively, the secondary heat transfer zone 42 may be operationally connected to other secondary systems, such as but not limited to, OBOGS, cabin air compressor motor coolers, and vapor cycle condensers. Embodiments of the secondary heat transfer zone 42 may be operationally connected to any system that is adapted to provide the second flow in need of cooling 44. For some applications, the integrated heat exchanger 40 may comprise more than one secondary heat transfer zone 42. For example, the integrated heat exchanger 40 can comprise two secondary heat transfer zones 42, one secondary heat transfer zone 42 operationally connected to a cabin air compressor motor cooler and the other secondary heat transfer zone 42 operationally connected to an OBOGS.

During operation, a source of bleed air (not shown) may provide the second flow in need of cooling 44 to the secondary heat transfer zone 42, as depicted in FIG. 9. At least a portion of the cooling flow 47 may pass through the secondary heat transfer zone 42 thereby cooling the second flow in need of cooling 44 such that the second cooled flow 46 is provided. For embodiments wherein the primary heat transfer zone 41 and the secondary heat transfer zone 42 are positioned in series relative to the cooling flow 47 (in series heat transfer zone configuration), all of the cooling flow 47 may pass through the secondary heat transfer zone 42. For embodiments wherein the primary heat transfer zone 41 and the secondary heat transfer zone 42 are positioned parallel relative to the cooling flow 47 (parallel heat transfer zone configuration), a first portion of the cooling flow 47 may pass through the primary heat transfer zone 41 and a second portion of the cooling flow 47 may pass through the secondary heat transfer zone 42.

For some applications, as depicted in FIG. 9, the second flow in need of cooling 44 may be provided by the OBIGGS 70 and may enter the secondary heat transfer zone 42 where it may be cooled to provide the second cooled flow 46. The second cooled flow 46 then may be directed to an adsorption separation module (ASM) 71 to generate a stream of nitrogen-enriched air (NEA) 73 and a stream of oxygen-enriched air (OEA) 74. The operating parameters of the OBIGGS 70, such as the flow rate of the second cooled flow 46 into the ASM 71, may be controlled by an OBIGGS controller 72 and may depend on the fuel tank inerting requirements of the particular application. In lieu of the OBIGGS 70, the second flow in need of cooling 44 may be provided by other secondary systems, such as but not limited to, OBOGS, cabin air compressor motor coolers, vapor cycle condensers, hydraulic systems, electrical systems, generators, power conversion systems, power distribution systems, avionics systems, engines and auxiliary power units (APU).

Figure 10:
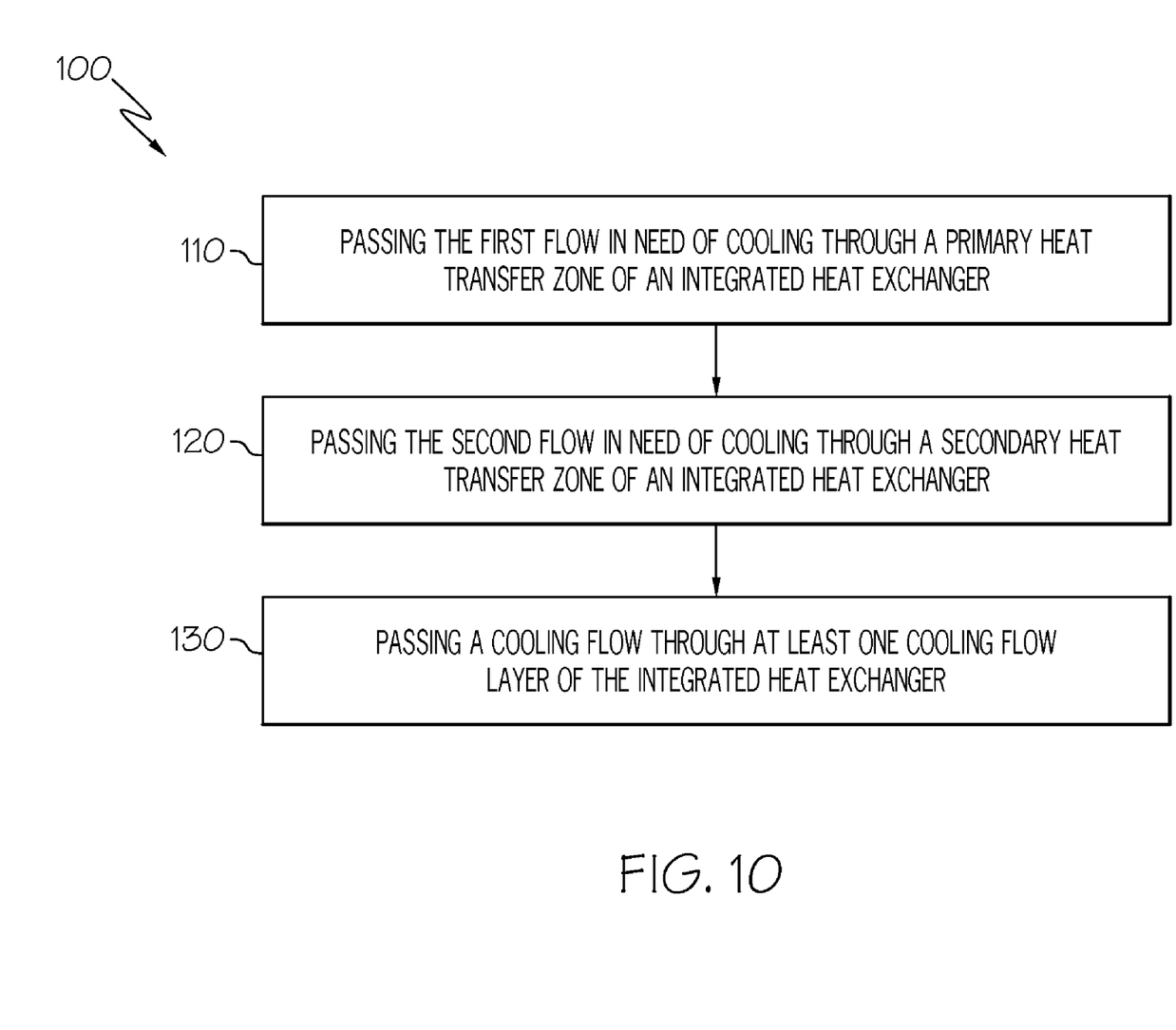
FIG. 10 is a flow chart of a method of cooling a first flow and a second flow according to an embodiment of the present invention.

A method 100 of cooling a first flow in need of cooling 43 and a second flow in need of cooling 44 is depicted in FIG. 10. The method 100 may comprise a step 110 of passing the first flow in need of cooling 43 (e.g. a flow of bleed air for use in an air conditioning system) through a primary heat transfer zone 41 of an integrated heat exchanger 40; a step 120 of passing the second flow in need of cooling 44 (e.g. a flow of bleed air for use in an OBIGGS) through a secondary heat transfer zone 42 of the integrated heat exchanger 40; and a step 130 of passing a cooling flow 47 (e.g. a ram flow) through at least one cooling flow layer 50 of the integrated heat exchanger 40. The step 110 of passing the first flow in need of cooling 43 through a primary heat transfer zone 41 of an integrated heat exchanger 40 may comprise passing the first flow in need of cooling 43 through a primary heat exchanger 61 of an air conditioning system 60 that has a vapor cycle pack configuration. The step 110 of passing the first flow in need of cooling 43 through a primary heat transfer zone 41 of an integrated heat exchanger 40 may comprise passing the first flow in need of cooling 43 through both a primary heat exchanger 61 and a secondary heat exchanger 62 of an air conditioning system 60 that has an air cycle pack configuration. The step 120 of passing the second flow in need of cooling 44 through a secondary heat transfer zone 42 of the integrated heat exchanger 40 can comprise passing the second flow in need of cooling 44 through a heat exchanger of an OBIGGS 70. The step 120 of passing the second flow in need of cooling 44 through a secondary heat transfer zone 42 of the integrated heat exchanger 40 can comprise passing the second flow in need of cooling 44 through a heat exchanger of an OBOGS. The step 120 of passing the second flow in need of cooling 44 through a secondary heat transfer zone 42 of the integrated heat exchanger 40 can comprise passing the second flow in need of cooling 44 through a heat exchanger of a cabin air compressor motor cooler system. The step 130 of passing a cooling flow 47 through at least one cooling flow layer 50 of the integrated heat exchanger 40 may comprise passing the cooling flow 47 such that the cooling flow 47 passes through the primary heat transfer zone 41 and passes through the secondary heat transfer zone 47. Alternatively, the step 130 of passing a cooling flow 47 through at least one cooling flow layer 50 of the integrated heat exchanger 40 may comprise passing the cooling flow 47 such that one portion of the cooling flow 47 passes through the primary heat transfer zone 41 and another portion of the cooling flow 47 passes through the secondary heat transfer zone 42.

As can be appreciated by those skilled in the art, embodiments of the present invention provide improved heat exchangers for use with ECS and OBIGGS applications. For some applications, embodiments having a parallel heat transfer zone configuration may minimize the impact on the ECS performance by avoiding the dumping of FTIS heat load onto the ECS heat exchanger and minimizing the impact on the pressure drop and thereby fan power consumption. The net benefit may be reduced impact on the cabin temperature especially on the ground during hot humid days. For some applications, embodiments of the present invention may minimize flow and temperature maldistributions that are inherent in applications where the FTIS heat exchanger is comparatively smaller than the ECS heat exchanger, thus improving ECS performance.

It should be understood, of course, that the foregoing relates to exemplary embodiments of the invention and that modifications may be made without departing from the spirit and scope of the invention as set forth in the following claims.

We claim:

1. An aircraft heat exchanging system comprising:
   a primary heat transfer zone comprising a heat exchanger of an air conditioning system; and
   a secondary heat transfer zone integral to said primary heat transfer zone, said secondary heat transfer zone comprising a heat exchanger for an inert gas generating system;
   planar separator plates contiguous with the primary and the secondary heat transfer zones;
   one or more heat transfer layers individually formed between two of the planar separator plates and contiguous with the primary and the secondary heat transfer zones; and
   one or more shared cooling flow layers contiguous with the primary and the secondary heat transfer zones and formed between two of the separator plates, wherein the shared cooling flow layers provide passages for a cooling flow of ram air to both the primary heat transfer zone and the secondary heat transfer zone, and wherein one or more of the planar separator plates is contiguous with both one of the heat transfer layers and one of the shared cooling flow layers.

2. The system of claim 1, wherein said primary heat transfer zone has a primary zone upstream face and said secondary heat transfer zone has a secondary zone upstream face; and wherein said primary zone upstream face is positioned downstream from said secondary zone upstream face.

3. The system of claim 1, wherein the at least one heat transfer layer is positioned such that said primary heat transfer zone comprises a first layer portion of said heat transfer layer and said secondary heat transfer zone comprises a second layer portion of said heat transfer layer.

4. The system of claim 1, wherein said air conditioning system has a vapor cycle pack configuration, and wherein said primary heat transfer zone comprises a primary heat exchanger.

5. The system of claim 1, wherein said air conditioning system has an air cycle pack configuration, and wherein said primary heat transfer zone comprises a primary heat exchanger and a secondary heat exchanger.

6. The system of claim 1, wherein said secondary heat transfer zone includes at least two separator plates and at least one flat tube, said flat tube positioned in contact with and extending between said two separator plates.

7. The system of claim 1, including an exchanger upstream face defined by a plane.

8. A ram air cooled heat exchanging system for an aircraft comprising:
   a stacked arrangement of alternating heat transfer layers and cooling flow layers, one portion of said stacked arrangement comprising a primary heat transfer zone and another portion of said stacked arrangement comprising a secondary heat transfer zone, said primary heat transfer zone comprising a heat exchanger that receives a first flow in need of cooling from an air conditioning system, said secondary heat transfer zone comprising a heat exchanger that receives a second flow in need of cooling from a secondary system; and
   a plurality of planar separator plates positioned such that one separator plate is between and in contact with each heat transfer layer/cooling flow layer pair, wherein:
   a cooling flow through at least one of the cooling flow layers provides cooling to both the primary heat transfer zone and the secondary heat transfer zone; and
   said secondary system is selected from the group consisting of on-board inert gas generating system, on-board oxygen generating system, cabin air compressor motor cooler and vapor cycle condenser.

* * * * *